(No Model.)
C. B. & T. D. STEWART.
CAR COUPLING.
No. 512,068. Patented Jan. 2, 1894.
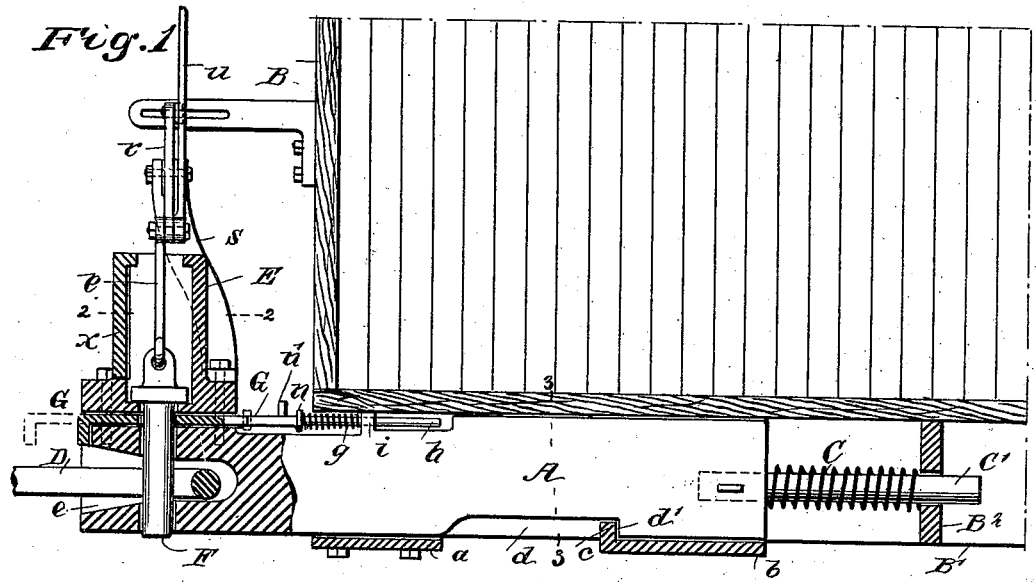
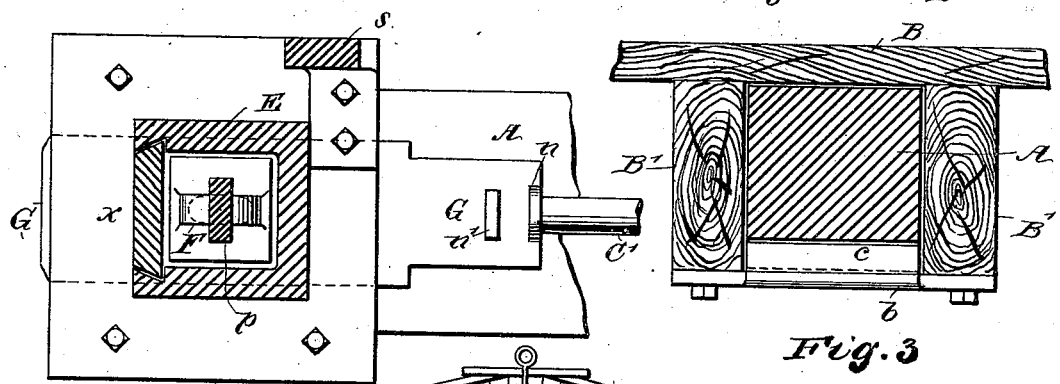
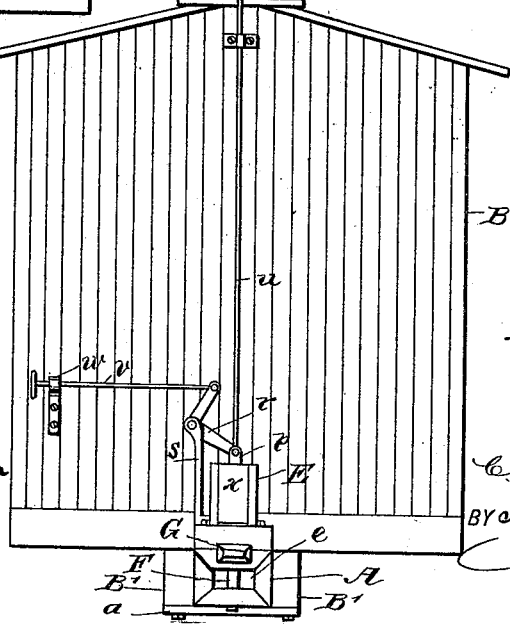
WITNESSES:
J. A. Bergstrom
C. Sedgwick
INVENTORS:
C. B. Stewart
T. D. Stewart
BY Munn & Co.
ATTORNEYS.
THE NATIONAL LITHOGRAPHING COMPANY,
WASHINGTON, D. C.

UNITED STATES PATENT OFFICE.

CHARLES B. STEWART AND THALES D. STEWART, OF WALLA WALLA, WASHINGTON.

CAR-COUPLING.

SPECIFICATION forming part of Letters Patent No. 512,068, dated January 2, 1894.

Application filed May 13, 1893. Serial No. 474,134. (No model.)

*To all whom it may concern:*

Be it known that we, CHARLES B. STEWART and THALES D. STEWART, of Walla Walla, in the county of Walla Walla and State of Washington, have invented a new and useful Improvement in Car-Couplings, of which the following is a full, clear, and exact description.

Our invention relates to improvements in car couplings of the link and vertical pin type, and has for its object to provide a device of the type indicated, which will be adapted to automatically couple two cars having the improvement, by the impact of one coupling drawhead upon the other, and that will be detachable from the side or roof of a car whereon the improvement is placed.

To these ends, our invention consists in the construction and combinations of parts as is hereinafter described and claimed.

Reference is to be had to the accompanying drawings forming a part of this specification, and to the letters of reference marked thereon, similar letters indicating corresponding parts in all the figures.

Figure 1 is a partial side view in section, of the improved car coupling, in position on a car front portion also in section. Fig. 2 is an enlarged plan view in section, of the front portion of the improvement, on the line 2—2 in Fig. 1. Fig. 3 is an enlarged transverse sectional view on the line 3—3 in Fig. 1; and Fig. 4 is a front end view of the improved coupling mechanism on the end of a car body.

The drawhead A, consists of an elongated metal block, which is loosely secured on the frame of the car B, at one end near the transverse center as usual, preferably by the keeper plates $a$, $b$, that are secured upon two stringers B', of the car as shown in Figs. 1 and 3, and serve to support the rear portion of the drawhead and permit it to slide longitudinally between said timbers of the car frame.

The rear extremity of the drawhead A, is cushioned by a spiral spring C, that encircles a guide bar C', which is fastened by one end to the end of the drawhead, and projects loosely through a transverse wall-piece B² of the car frame, so located that the spring will have pressure with its ends upon the drawhead and wall piece, as shown in Fig. 1.

The drawhead is longitudinally grooved or recessed on its lower side, between the keeper plates $a$, $b$, and the latter named plate has a lug $c$, bent upwardly on its front edge, and caused to enter the recess $d$, the rear shoulder $d'$ of which recess serves to check the forward movement of the drawhead and thus prevents an outward displacement of the latter.

The front end portion of the drawhead A, is chambered, and outwardly flared in said chamber, as indicated at $e$, in Fig. 1, for the free introduction of an ordinary coupling link D.

On the forwardly projecting portion of the drawhead A, the guide box E, is located and secured, which box is preferably given a rectangular form and has a sufficient height and area in cross section to adapt it to loosely support the coupling pin F, when the latter is in elevated adjustment. A longitudinal slot of proper dimensions and form, is produced between the top wall of the drawhead A and the guide box base that engages it, which slot receives the diaphragm plate G, that is made to loosely fit therein. The diaphragm plate G projects through the slot it occupies, at its front and rear end, and is normally pressed toward the front by a spring $g$ that engages a slide rod $h$ which projects rearwardly from the diaphragm plate, and passes through a perforated ear $i$, that is on the drawhead top wall, the stress of the spring being exerted upon the ear at one end, and a collar $n$ on the rod $h$, which causes the plate G to assume the position indicated by dotted lines in Fig. 1, the block $n'$ on the plate limiting its forward movement. A vertical perforation is formed in the diaphragm plate G, and the drawhead A, aperturing these parts in alignment when the plate is in forward adjustment, said perforations being of a diameter that will permit the insertion of the cylindrical coupling pin F, and its free reciprocation therein, the pin falling by gravity into position as shown in Fig. 1.

The forward end portion of the diaphragm plate G is bent downwardly to provide a head thereon which is designed to receive the impact of a similar plate, or the front end of the drawhead, when two car couplings of the improved construction are made to have forcible contact, such as generally results when cars are moved toward each other in making up trains.

The upper portion of the coupling pin F is furnished with a collar that limits the descent of the pin through the drawhead A; a perforated ear is also formed on the upper end of the pin, and affords means for the loose connection therewith of a link bar p, that projects upwardly through the guide box E.

There is a bell crank lever r, supported to rock by its pivoted engagement with the upper end of a vertical bracket arm s, that has its lower end affixed upon the base flange of the guide box E, and one limb of the bell crank lever projecting toward the top end of the link bar p, is thereto connected by a pivot bolt that also loosely secures the lower end of the draft rod u, upon the link bar, as shown in Figs. 1 and 4. The rod u, is vertically extended to reach the top or roof of the car body B, and is furnished with a grip piece for its convenient manipulation.

A horizontal pull bar v, is loosely secured by its inner end upon the upright limb of the bell crank lever r, and is held free to slide longitudinally on the front wall of the car body, by a bracket box w, or equivalent means, the length of this bar being sufficient to permit a handle on its outer end to be safely manipulated from the side of the car.

When the rod u, or pull bar v, is operated to rock the lower limb of the bell crank lever r, upwardly, the coupling pin F, will be elevated sufficiently to permit the diaphragm plate G, to be projected forwardly and form a seat for the pin, which is thus maintained in elevated adjustment, until two cars are brought together that are provided with the improved couplings, which will cause the plate G to be slid rearwardly, and allow the pin F to drop through the link D, that has been interlocked with one coupling, and held projected therefrom to enter the other coupling drawhead, a manipulation of the rod u, or bar v, serving to release the link, by an upward movement of the coupling pin, as before mentioned.

The front wall x of the guide box E, is made removable by dovetailing it and correspondingly grooving the side walls of said box to receive the removable wall, this provision being made to facilitate the removal of a bent pin or replace a wornout and broken coupling pin when this is necessary.

If it is desired, an ordinary bull-nose car coupling such as is in common use may be connected with the improved coupling by the use of the elongated link D, that may be coupled by hand to the common coupling, and supported by any suitable means for an automatic attachment with the improvement that will be produced by the impact of the common drawhead upon the diaphragm plate G, as before explained.

Having thus described our invention, we claim as new and desire to secure by Letters Patent—

1. The combination with a drawhead chambered in front and vertically perforated, of a guide box thereon adapted to be opened at the front, a spring-pressed perforated diaphragm plate held to slide longitudinally between the guide box and drawhead, a coupling pin working in the guide box and adapted to pass through the holes in the diaphragm plate and drawhead when said perforations are aligned, and means to lift the pin, substantially as described.

2. The combination with a drawhead supported to slide on keeper plates secured on stringers of the car frame, and spring-pressed forwardly, a longitudinal recess below and rearward on the drawhead, a lug on one keeper plate sliding in said recess and adapted to check the forward movement of the drawhead, and a flared chamber forwardly in the drawhead, having a vertical perforation therein, of a guide box above said perforation, a vertically adjustable pin in the box, engaging the perforation of the drawhead, a perforated and longitudinally slidable diaphragm plate located in a slot between the box and drawhead and spring-pressed forwardly, and a device that will elevate the pin when worked from the top or side of the car, substantially as described.

3. The combination with a drawhead chambered at the front and vertically perforated through the chamber, of a guide box secured on the drawhead and adapted to guide a vertical coupling pin in the perforation, and having a removable front wall, substantially as described.

CHARLES B. STEWART.
THALES D. STEWART.

Witnesses:
B. L. SHARPSTEIN,
BERTHA BALLOU.